US005606698A

United States Patent [19]
Powell

[11] Patent Number: 5,606,698
[45] Date of Patent: Feb. 25, 1997

[54] METHOD FOR DERIVING OPTIMAL CODE SCHEDULE SEQUENCES FROM SYNCHRONOUS DATAFLOW GRAPHS

[75] Inventor: Douglas B. Powell, San Francisco, Calif.

[73] Assignee: Cadence Design Systems, Inc., San Jose, Calif.

[21] Appl. No.: 400,540

[22] Filed: Mar. 7, 1995

Related U.S. Application Data

[63] Continuation of Ser. No. 53,607, Apr. 26, 1993, abandoned.
[51] Int. Cl.$^6$ ................................................. G06F 9/45
[52] U.S. Cl. ............................................................ 395/709
[58] Field of Search ...................................... 395/650, 700

[56] References Cited

U.S. PATENT DOCUMENTS

| | | | |
|---|---|---|---|
| 4,571,678 | 2/1986 | Chaitin | 395/700 |
| 4,802,091 | 1/1989 | Cocke et al. | 395/700 |
| 4,833,606 | 5/1989 | Iwasawa | 395/700 |
| 4,885,684 | 12/1989 | Austin et al. | 395/650 |
| 5,109,331 | 4/1992 | Ishida et al. | 395/375 |
| 5,146,594 | 9/1992 | Iitsuka | 395/700 |
| 5,193,190 | 3/1993 | Janczyn et al. | 395/700 |
| 5,202,995 | 4/1993 | O'Brien | 395/700 |
| 5,230,053 | 7/1993 | Zaiki | 395/700 |
| 5,265,253 | 11/1993 | Yamada | 395/700 |
| 5,283,901 | 2/1994 | Masuyama | 395/700 |
| 5,303,357 | 4/1994 | Inoue et al. | 395/375 |
| 5,361,354 | 11/1994 | Greyzck | 395/700 |

FOREIGN PATENT DOCUMENTS

| | | |
|---|---|---|
| 63-094332 | 9/1988 | Japan . |
| 2-051739 | 5/1990 | Japan . |
| 2-181830 | 10/1990 | Japan . |
| 3-161837 | 10/1991 | Japan . |

OTHER PUBLICATIONS

"Static Rate–Optimal Scheduling of Iterative Data Flow Programs via Optimum Unfolding" Parhi et al, IEEE, vol. 40, No. 2, Feb. 1991, pp. 178–195.
"A Polynomial–Time Algorithm for the Computation of the Iteration Period Bound in Recursive Data Flow Graphs," Gerez, IEEE, vol. 39 No. 1, Jan. 1992, pp. 49–52.

Primary Examiner—Parshotam S. Lall
Assistant Examiner—Viet Vu
Attorney, Agent, or Firm—John T. McNelis; Fenwick & West LLP

[57] ABSTRACT

A method is disclosed for deriving code schedule sequences for a target code generator from an input ordering of nodes and prime factors of their respective ordered invocation rates from an SDF graph representative of a system. The method involves first creating a loop set for each prime factor wherein the elements of each loop set are the actors, the invocation frequency from which are factorable by that prime factor and are ordered. The redundant created loop sets are merged so as to eliminate those sets with identical nodes. The merged loop sets are then sorted in decreasing order by the total number of node elements in each set. A determination is then made as to whether each loop set is a proper subset of its sorted ordered predecessor loop set with which it intersects and, if not, then breaking the non-disjoint sets into sublists of sets which are proper subsets of their predecessor sets and then determining whether the parent sets of the broken sublists are then disjoint from one another. If they are not then repeating these two substeps. The next step of the present method then involves extracting a loop schedule for each sublist and combining the extracted loop schedules in accordance with the sorted precedence ordering of the nodes in each of said loop sets to produce the code schedule sequences. In such a manner, the code schedule sequences generated corresponds to every potential type of actor or block in the system and can then be used to minimize both program and data memory requirements of the scheduled systems.

5 Claims, 9 Drawing Sheets

SCHEDULE: XYYYYZZZZZZZZZZZZ

FIG. 2B (PRIOR ART)

| ARC | $X_1$ | $Y_1$ | $Y_2$ | $Y_3$ | $Y_4$ | $Z_1$ | $Z_1$ | $Z_2$ | $Z_3$ | $Z_4$ | $Z_6$ |
|---|---|---|---|---|---|---|---|---|---|---|---|
| a | 4 | 3 | 2 | 1 | 0 | 0 | 0 | 0 | 0 | 0 | 0 |
| b | 0 | 3 | 6 | 9 | 12 | 11 | 10 | 9 | 8 | 7 | 6 |
| TOTAL | 4 | 6 | 8 | 10 | 12 | 11 | 10 | 9 | 8 | 7 | 6 |

| ARC | $Z_7$ | $Z_8$ | $Z_9$ | $Z_{10}$ | $Z_{11}$ | $Z_{12}$ |
|---|---|---|---|---|---|---|
| a | 0 | 0 | 0 | 0 | 0 | 0 |
| b | 5 | 4 | 3 | 2 | 1 | 0 |
| TOTAL | 5 | 4 | 3 | 2 | 1 | 0 |

FIG. 2C (PRIOR ART)

SCHEDULE: XYZZZYZZZYZZZYZZZ

FIG. 3A (PRIOR ART)

| ARC | $X_1$ | $Y_1$ | $Y_2$ | $Y_3$ | $Y_4$ | $Z_1$ | $Z_1$ | $Z_2$ | $Z_3$ | $Z_4$ | $Z_6$ |
|---|---|---|---|---|---|---|---|---|---|---|---|
| a | 4 | 3 | 3 | 3 | 3 | 2 | 2 | 2 | 2 | 1 | 1 |
| b | 0 | 3 | 2 | 1 | 0 | 3 | 2 | 1 | 0 | 3 | 2 |
| TOTAL | 4 | 6 | 5 | 4 | 3 | 5 | 4 | 3 | 2 | 4 | 3 |

| ARC | $Z_7$ | $Z_8$ | $Z_9$ | $Z_{10}$ | $Z_{11}$ | $Z_{12}$ |
|---|---|---|---|---|---|---|
| a | 1 | 1 | 0 | 0 | 0 | 0 |
| b | 1 | 0 | 3 | 2 | 1 | 0 |
| TOTAL | 2 | 1 | 3 | 2 | 1 | 0 |

FIG. 3B (PRIOR ART)

```
MAIN 0 {
    ...
    ...
    CODE SEGMENT FOR X
    ...
    ...
    FOR (i=0;i<4;i++){
        ...
        ...
        CODE SEGMENT FOR Y
        ...
        ...
    }
    FOR (i=0;i<12;i++){
        ...
        ...
        CODE SEGMENT FOR Z
        ...
        ...
    }
}
```

| GRAPH | SCHEDULE |
|---|---|
| ROOT | (2D)(3 CLUSTER4) B C |
| CLUSTER4 | A (2 CLUSTER3) |
| CLUSTER3 | (3 CLUSTER2) G |
| CLUSTER2 | E CLUSTER1 |
| CLUSTER1 | H F |

FIG. 8A (PRIOR ART)

SCHEDULE: (2D)(3A(3EHF)G))BC

SCHEDULE: (2 CLUSTER5)CLUSTER4 BC ⇒
(2DA(2(3EHF)G))A(2(3EHF)G)BC

FIG. 10B (PRIOR ART)

REACHABILITY MATRIX

|   | A | B | C | D | E |
|---|---|---|---|---|---|
| A | 0 | 1 | 1 | 1 | 1 |
| B | 0 | 0 | 1 | 1 | 0 |
| C | 0 | 0 | 0 | 1 | 0 |
| D | 0 | 0 | 0 | 0 | 0 |
| E | 0 | 0 | 0 | 0 | 0 |

METHOD FOR DERIVING OPTIMAL CODE SCHEDULE SEQUENCES FROM SYNCHRONOUS DATAFLOW GRAPHS

This is a continuation of application Ser. No. 08/053,607 filed on Apr. 26, 1993 now abandoned.

FIELD OF THE INVENTION

This invention relates to the static compilation of software code for data processing systems developed using synchronous data flow (SDF) programming, and more specifically to a method of compacting the target code at compile time, by scheduling an SDF graph which represents the system, in a manner which takes advantage of opportunities to create loop constructs in the code for successive invocation of identical system functions.

BACKGROUND OF THE INVENTION

The performance of data processing systems is typically measured by the system's throughput as well as by the required size of the program and data memory. Those skilled in the art have recognized that certain types of processing systems, such as those specialized for digital signal processing (DSP) applications, can better utilize their computational resources if they are programmed using a technique called synchronous data flow (SDF) programming. One background reference to such techniques is a paper authored by E. A. Lee and D. G. Messerschmitt titled: "Static Scheduling of Synchronous Data Flow Programs for Digital Signal Processing," IEEE Transactions on Computers, Vol. C-36, pp 24–35 (1987).

Using this technique, the system is represented by blocks or nodes, each of which represents a particular system function or actor. Depending upon the complexity of an actor, it could be itself represented by a number of sub-blocks. Each block or node has a segment of program code associated with it which when executed implements the function in the system. Each block can execute (i.e. fire) at any time provided its requisite input data is available.

Figure 1A:
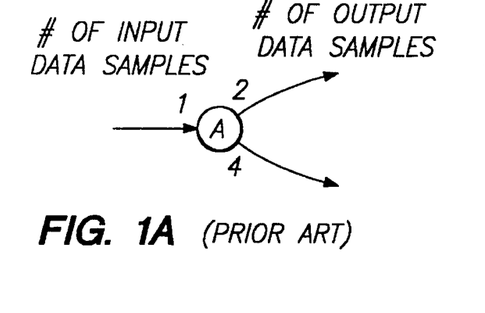
FIG. 1a is an illustration of a synchronous block.
Figure 1B:
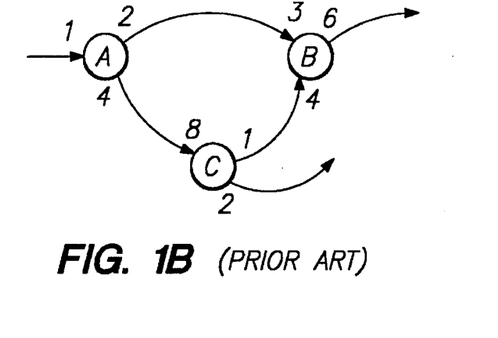
FIG. 1b is an illustration of a synchronous data flow graph.

Thus, a block is a function that is invoked when there is sufficient input data available with which to perform a computation. Blocks that have no inputs can be invoked at any time. Each time a block is invoked it consumes a fixed number of data samples and will produce a fixed number of data samples. A block that has no inputs consumes zero data samples. A block is synchronous if the number of input samples it consumes and the number of output samples produced can be specified a priori each time the block is invoked. A synchronous block A can be represented as shown in FIG. 1a, including a number associated with each input or output to specify the number of input data samples consumed and the number of output data samples produced for each output, each time the block is invoked. A synchronous data flow (SDF) graph is a network of synchronous blocks, as illustrated in FIG. 1b. The arcs between blocks indicate the flow of data between blocks, and can also represent buffer memory in which such data must usually be stored until the block which consumes the data is actually invoked.

Figure 1C:
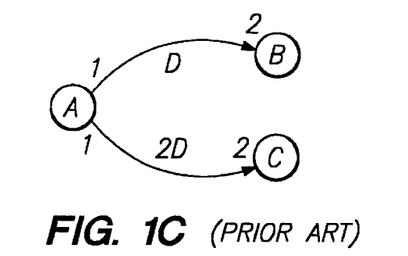
FIG. 1c is an illustration of a synchronous data flow graph having delays between nodes.

FIG. 1c illustrates an SDF graph which indicates the existence of delays between the nodes. Delays used in the signal processing context indicate that there is an offset between the input and output block. The unit delay on the arc between Block A and Block B means that the $n^{th}$ sample consumed by B is the $(n-1)^{th}$ sample produced by A; the first sample consumed by B is therefore not produced by the source Block A, but is rather part of the initial state of the arc buffer. Thus, Block B can be invoked once before Block A is ever invoked, and the delay thereby affects the way the system starts up.

From the SDF graph representing a system, an execution order for the actors can be derived. From this schedule, code can be generated for the program from a library of code segments which corresponds to every potential type of actor or block in a system. The code segments are compiled such that the actors or functional blocks are invoked in an order which is consistent with the SDF graph for the system.

Figure 2A:
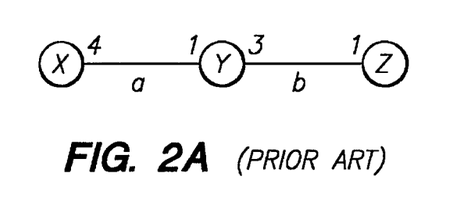
FIG. 2a is an illustration of a synchronous data flow graph.
Figure 2B:
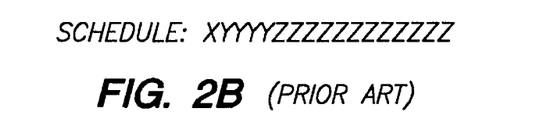
FIG. 2b is an illustration of an execution schedule of a synchronous data flow graph.

In FIG. 2a, an SDF graph is shown which represents a system having three functions or Actors, X, Y and Z. Arcs a and b illustrate the direction of the flow of data between the actors. In FIG. 2b, an execution schedule is defined which is consistent with the graph. X must be invoked first, because Y must have at least one sample of data from X before it may be invoked, and Z must have at least one data sample from Y before it may be invoked. Thus, a program according to the schedule of FIG. 2b would run the software segment for X, then four iterations of Y and finally twelve iterations of Z. At the end of the schedule, all samples of data produced have also been consumed.

Figure 2C:
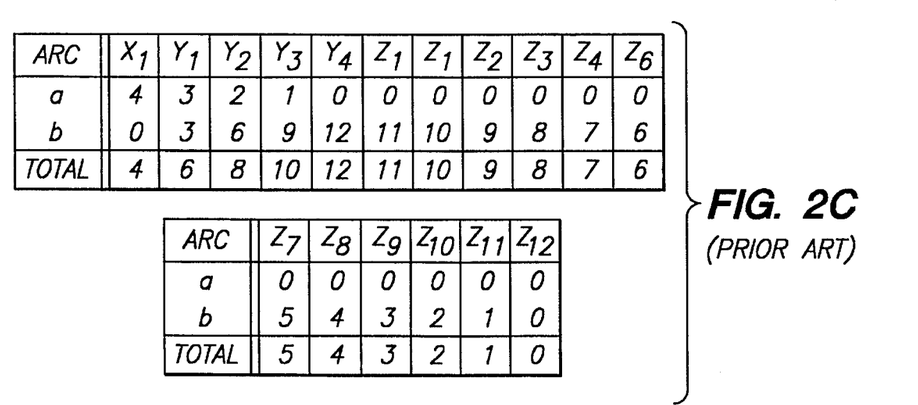
FIG. 2c is a table describing buffer array utilization for each block invocation of the execution schedule.

There are other schedules which may be derived from the SDF graph in FIG. 2a which are more optimal in terms of the data memory required to buffer the data between actors. FIG. 2c is a table which describes the use of buffer memory represented by the arcs a and b for each block invocation of the schedule in FIG. 2b. It can be seen from the table in FIG. 2c that the total buffered data is at a maximum of twelve samples for the fourth invocation of Y. This schedule is the maximum buffer length schedule for the system.

Figure 3A:
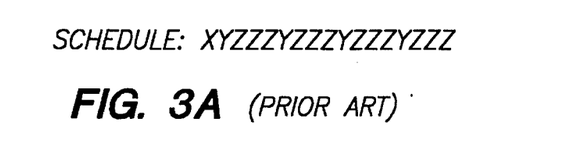
FIG. 3a is an illustration of an execution schedule of a synchronous data flow graph.
Figure 3B:
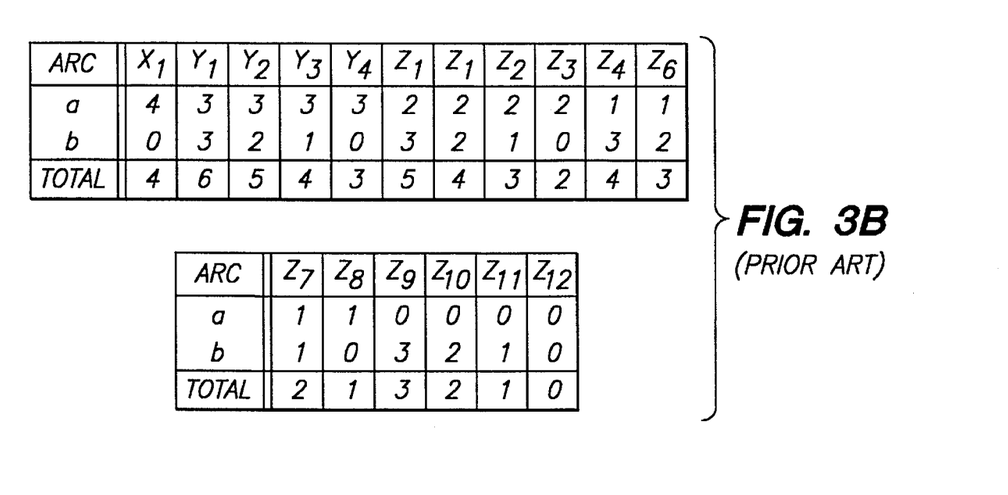
FIG. 3b is a table describing buffer array utilization for each block invocation of the execution schedule.

A second possible schedule which can be derived from the SDF graph of FIG. 2a is shown in FIG. 3a. A table describing the use of buffer memory for this schedule is illustrated in FIG. 3b. It can be seen from this table that the data memory requirement for the schedule of FIG. 3a is half of that for FIG. 2b. Another advantage of the schedule in FIG. 3a is improved latency characteristics of the systems. Block Z begins producing data samples sooner in the schedule of FIG. 3a because Block or Actor Z is invoked sooner in that schedule.

Figure 4:
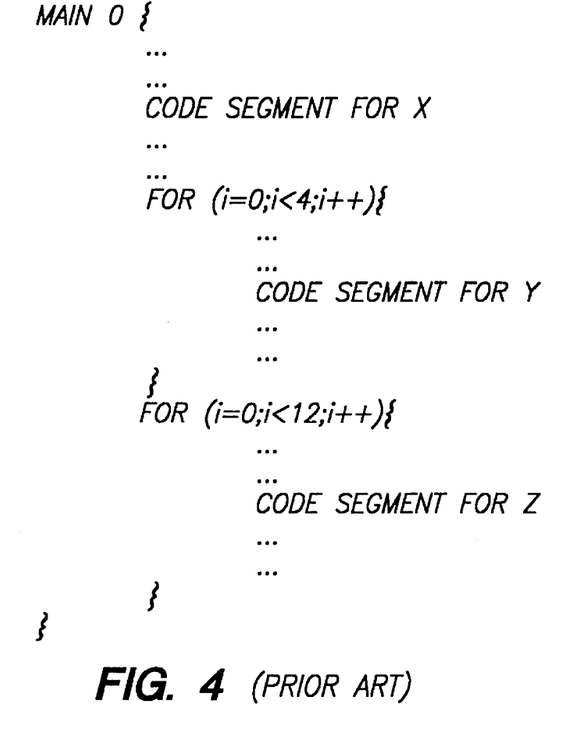
FIG. 4 is an example of computer code for implementing the schedule of FIG. 2b.

Schedules derived from SDF graphs can also be optimized to minimize the amount of program code necessary to implement the system, thereby reducing the amount of memory necessary to store the system program. This can be accomplished by creating loop constructs (e.g. "do-while") wherever there are iterative invocations of an actor. Thus, for each grouping of repetitive invocations of an actor, only one copy of the code segment associated with that actor is required, plus the small amount of code overhead for setting up and testing the loop. The schedule of FIG. 2b can be written as X(4Y)(12Z), which is referred to as a looped schedule and for which each parenthesized subschedule is known as a schedule loop. Sample target code for this looped scheduled is illustrated in FIG. 4 using the "C" programming language structure. FIG. 4 illustrates the compaction obtained in looping and the comparatively minor overhead necessary to implement the looping.

It can be seen from the previous discussion that where it is important to minimize the amount of memory necessary to buffer data and to store a system's program code, there is a need to optimize schedules derived from SDF graphs. The more iterative the nature of the system, the more opportunity there is for looping in the target program code. Systems designed specifically for DSP applications are particularly amenable to looping. Further, such systems are typically implemented as integrated circuits, which makes the motivation for minimizing program memory size very strong.

A method for deriving looped schedules from SDF graphs was proposed by Shuvra S. Bhattacharyya in a Masters of Science research project paper, submitted on May 9, 1991 to the Department of Electrical Engineering and Computer Sciences at the University of California at Berkeley. The paper is entitled, "Scheduling Synchronous Data Flow Graphs for Efficient Iteration."

The method disclosed by Bhattacharyya is a technique for hierarchically clustering the actors of an SDF graph to expose opportunities for looping. This method forms clusters or supernodes with two actors at a time. A cluster is a group of connected actors which the scheduler considers to be an indivisible unit to be invoked without interruption. The method is entitled "Pairwise Grouping of Adjacent Nodes" (nodes are equivalent to actors or blocks as defined in this document).

Figure 5:
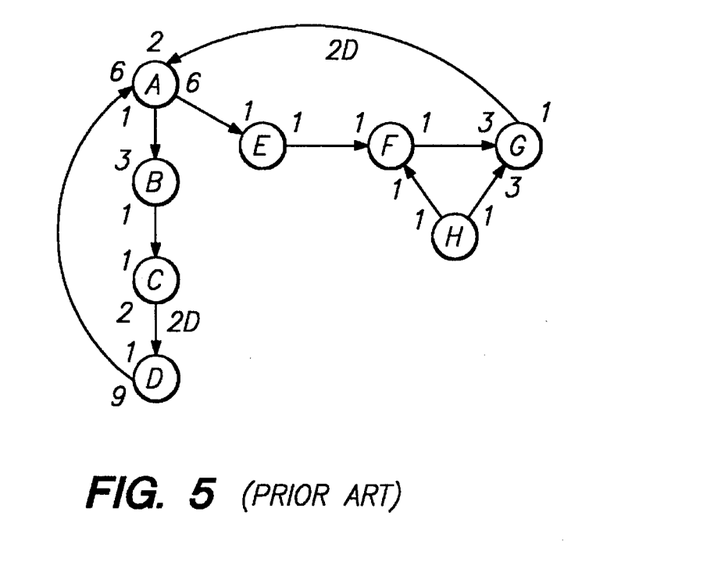
FIG. 5 is an illustration of a multirate synchronous data flow graph.
Figure 6:
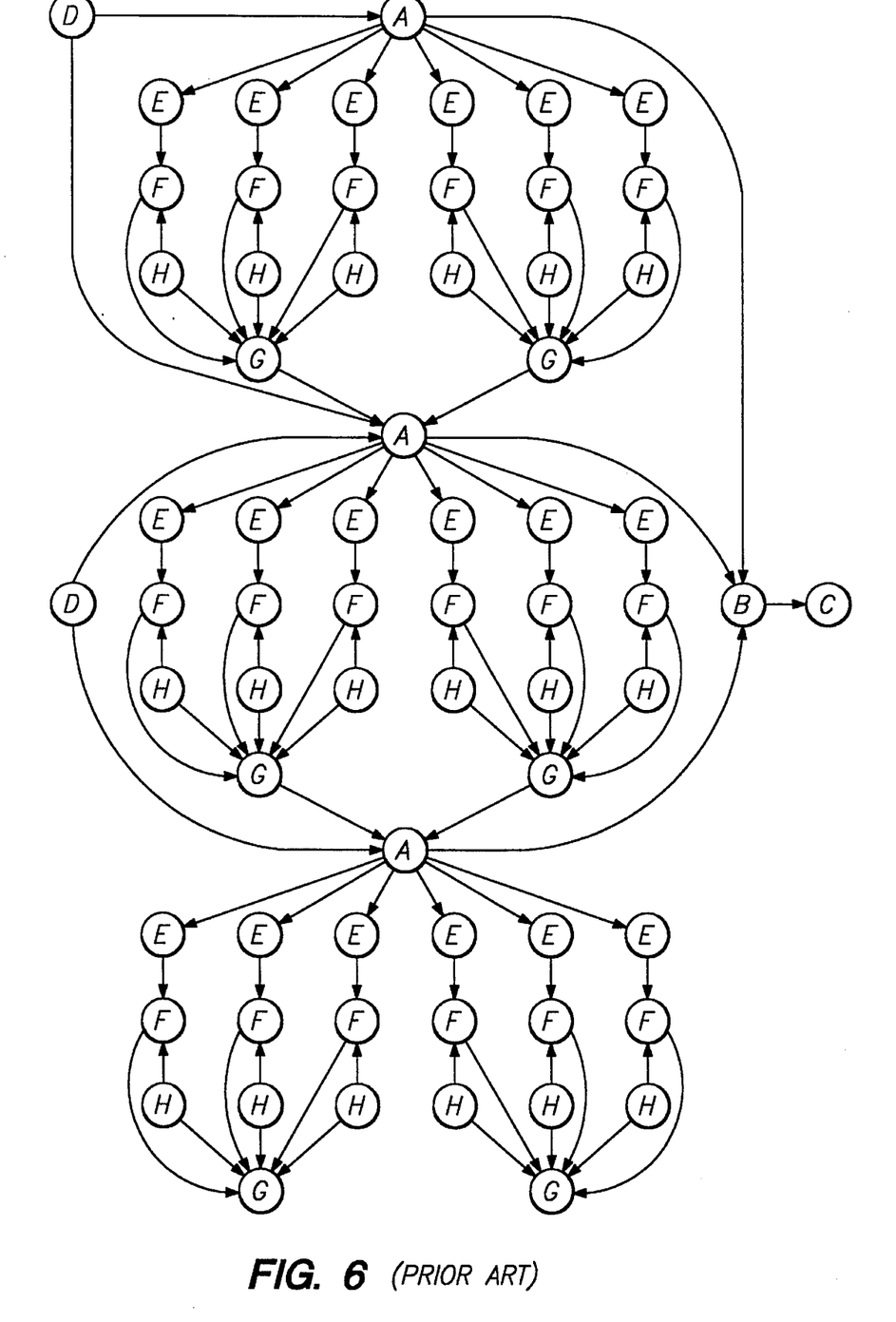
FIG. 6 is an illustration of a acyclic precedence graph representing the multirate synchronous data flow graph of FIG. 5.
Figure 7:
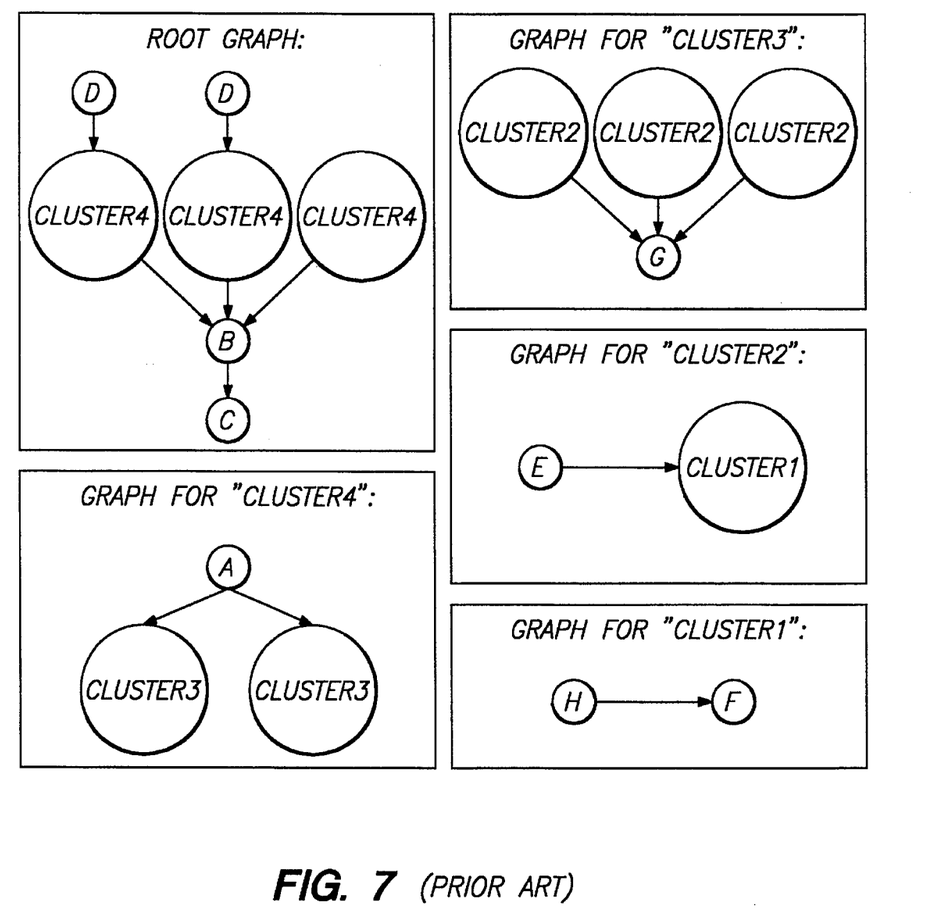
FIG. 7 is an illustration of a hierarchy of clusters created by clustering two nodes of FIG. 5.
Figure 8A:
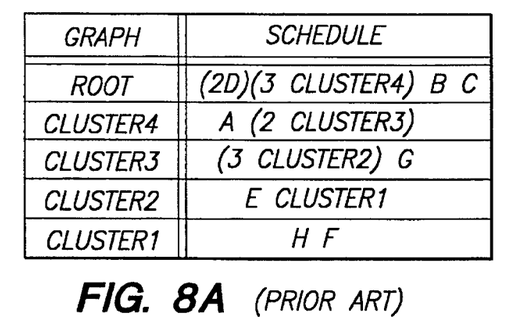
FIG. 8a is an illustration of a schedule table for FIG. 5.
Figure 8B:
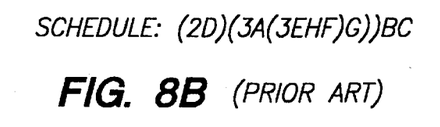
FIG. 8b is an illustration of a looped schedule derived from FIG. 7.
Figure 9:
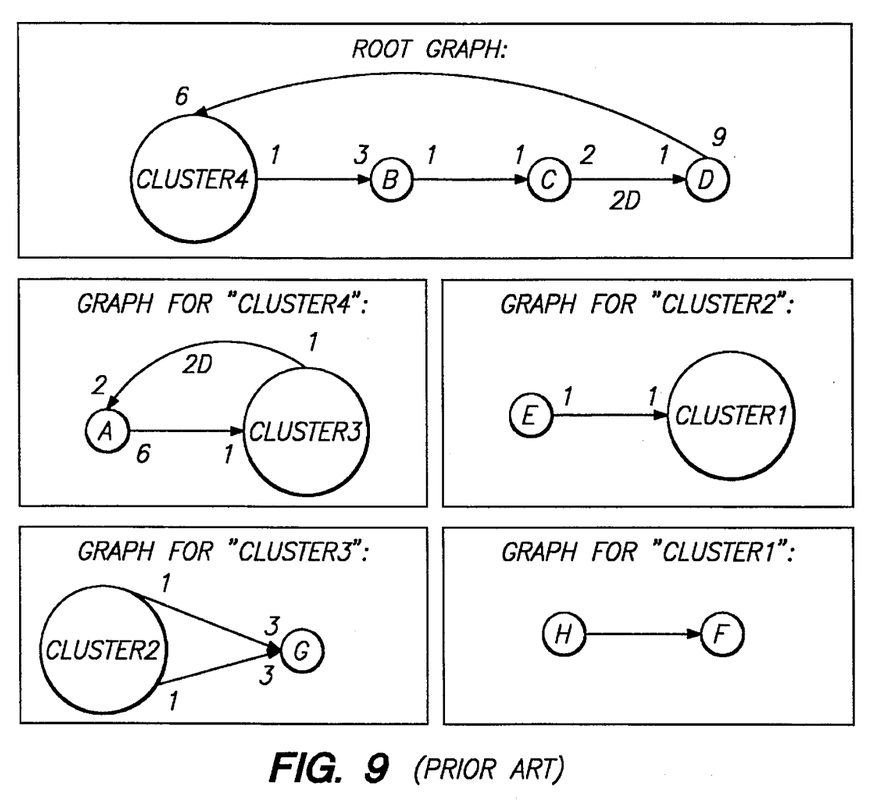
FIG. 9 illustrates a correspondence between clusters of FIG. 5 and clusters of FIG. 7.

An example of the method disclosed by Bhattacharyya can be illustrated with reference to FIGS. 5–8b. FIG. 5 presents a multirate SDF graph which presents opportunities for looping in its scheduling. FIG. 6 illustrates an acyclic precedence graph (APEG) which represents the SDF graph of FIG. 5. FIG. 7 illustrates the hierarchy of clusters created by clustering two nodes at a time and FIG. 8b illustrates the looped schedule which can be derived from the hierarchical decomposition of FIG. 7. The table of FIG. 8a illustrates how the schedule of FIG. 8b can be derived from FIGS. 6 and 7. Because each of the clusters of FIG. 7 spans all invocations of the nodes which it subsumes, each cluster also corresponds to hierarchical clusters in the original SDF graph of FIG. 5. This correspondence is illustrated in FIG. 9.

Figure 10A:
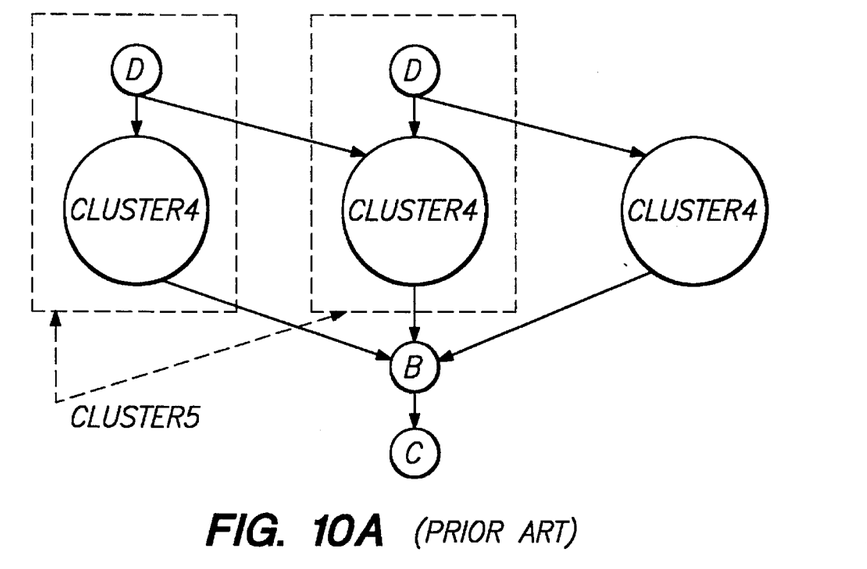
FIG. 10a is an illustration of a consolidated multirate synchronous data flow graph.
Figure 10B:
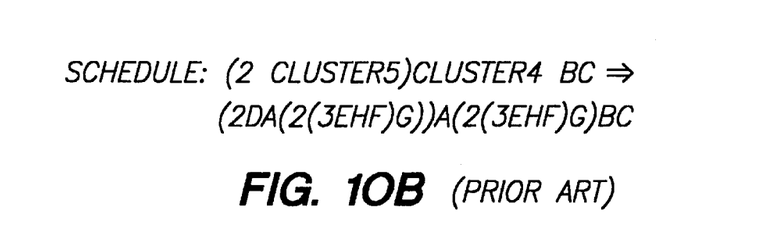

Had the first and second invocations of D been consolidated with the first and second invocations of cluster 4, however, the resulting APEG subgraph would not translate to the SDF graph of FIG. 5. This consolidation is shown in FIG. 10a, and the resulting schedule in FIG. 10b. The code size is increased substantially because all of the invocations of cluster4 cannot be encompassed within the schedule loop including Actor D and cluster4. The only way such a schedule loop could span all invocations of cluster4 is if the ratio of invocations of D to the number of invocations of cluster4 in that schedule loop is equal to the ratio of the total number of invocations of D to the total number of invocations of cluster4.

The method therefore must select the proper adjacent nodes (i.e. actors) with which to form an appropriate cluster by selecting a node or hierarchical super node as the base node for the cluster (based on the node most likely to be involved in the deepest level of a nested loop); the method must choose between the possible adjacent nodes with which to combine the base node to form a cluster; and the method must verify that the candidate cluster will not result in a deadlocked graph. A deadlocked graph is one where the cluster must create data for another actor or node but which requires data in order to fire itself. This is referred to as a directed delay-free loop.

Figure 11A:
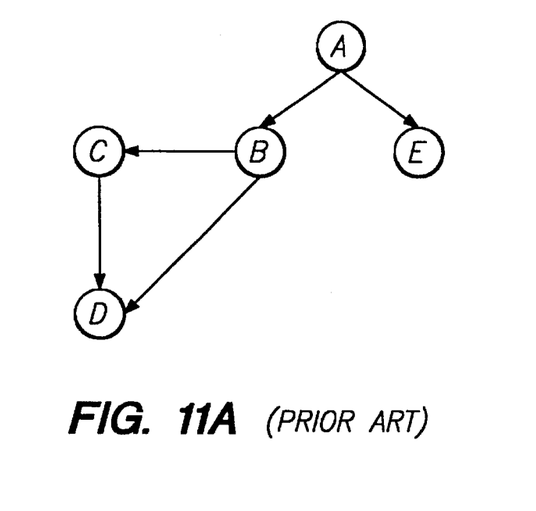
FIG. 11a is an illustration of an acyclic precedence graph.
Figure 11B:
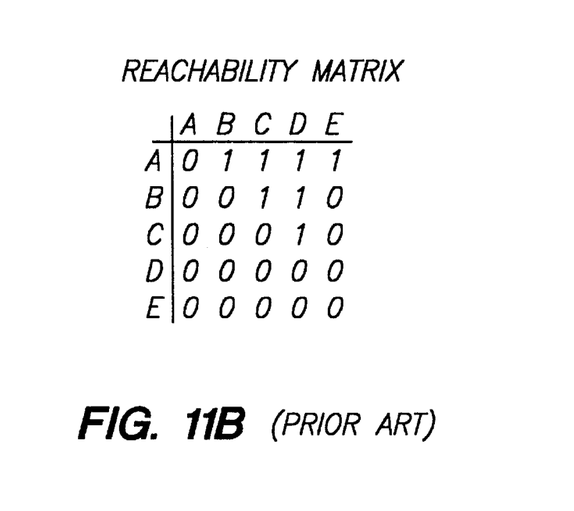

The base node is selected based on which node not already selected as a base node has the highest frequency of invocation. The adjacent node is selected by choosing the candidate which matches up with the fewest number of base node invocations within a single invocation of a resulting cluster. Verifying that a cluster does not result in a deadlocked schedule requires that for every cluster created, the resulting APEG which includes the new cluster must have a reachability matrix calculated for the resulting APEG. If the reachability matrix contains no nonzero diagonal elements, then no cycle was introduced through the combination of the two nodes. If any of the diagonal elements are nonzero, then the schedule will result in deadlock and the two nodes cannot be combined. FIG. 11a illustrates an APEG; and a reachability matrix for that APEG is shown in FIG. 11b.

The above-described prior art method is extremely complex and resource intensive. The creation of the APEG graphs for complex systems with high sample rates would require a large amount of data memory and computation time. Further, the reachability matrices which must be calculated each time two nodes are clustered demands additional memory space and computation. Still further, there are certain types of systems which this method may not handle optimally. Finally, this method does not appear to be easily adapted to optimize other performance concerns, such as latency or speed of execution.

SUMMARY OF THE INVENTION

The present invention relates to the static compilation of software code from data processing systems developed using synchronous data flows (SDF) programming and, more specifically, to a method of compacting the target code at compile time, by scheduling an SDF graph which represents the system, in a manner which takes advantage of opportunities to create loop constructs in the code for successive invocations of identical system functions.

It is an object of the present invention to provide a method for deriving code schedules from SDF graphs which minimizes both program and data memory requirements of the scheduled system.

It is another object of this invention to provide a method which minimizes the storage and computational resources of the system on which it is implemented.

It is a further object to provide a method which is applicable to all types of systems and which can be adapted to optimize a combination of performance criteria.

Briefly summarized, a method is disclosed for deriving code schedule sequences for a target code generator from an input ordering of nodes and prime factors of their respective ordered invocation rates from an SDF graph representative of a system. The method involves first creating a loop set for each prime factor wherein the elements of each loop set are the actors, the invocation frequency from which are factorable by that prime factor and are ordered. The redundant created loop sets are merged so as to eliminate those sets with identical nodes. The merged loop sets are then sorted in decreasing order by the total number of node elements in each set. A determination is then made as to whether each loop set is a proper subset of its sorted ordered predecessor loop set with which it intersects and, if not, then breaking the non-disjoint sets into sublists of sets which are proper subsets of their predecessor sets and then determining whether the parent sets of the broken sublists are then disjoint from one another. If they are not then repeating these two substeps. The next step of the present method then involves extracting a loop schedule for each sublist and combining the extracted loop schedules in accordance with the sorted precedence ordering of the nodes in each of said loops sets to produce the code schedules. In such a manner, the code schedule sequences generated corresponds to every potential type of actor or block in the system and can then be used to minimize both program and data memory requirements of the scheduled systems.

BRIEF DESCRIPTION OF THE DRAWINGS

FIG. 10b is an illustration of an execution schedule derived form FIG. 10a.

FIG. 11b is an illustration of a reachability matrix for the acyclic precedence graph of FIG. 11a.

DETAILED DESCRIPTION OF THE INVENTION

The present invention relates to the static compilation of software code from data processing systems developed using synchronous data flow (SDF) programming and, more specifically, to a method of compacting the target code at compile time, by scheduling an SDF graph which represents the system, in a manner which takes advantage of opportunities to create loop constructs in the code for successive invocations of identical system functions.

Figure 12:
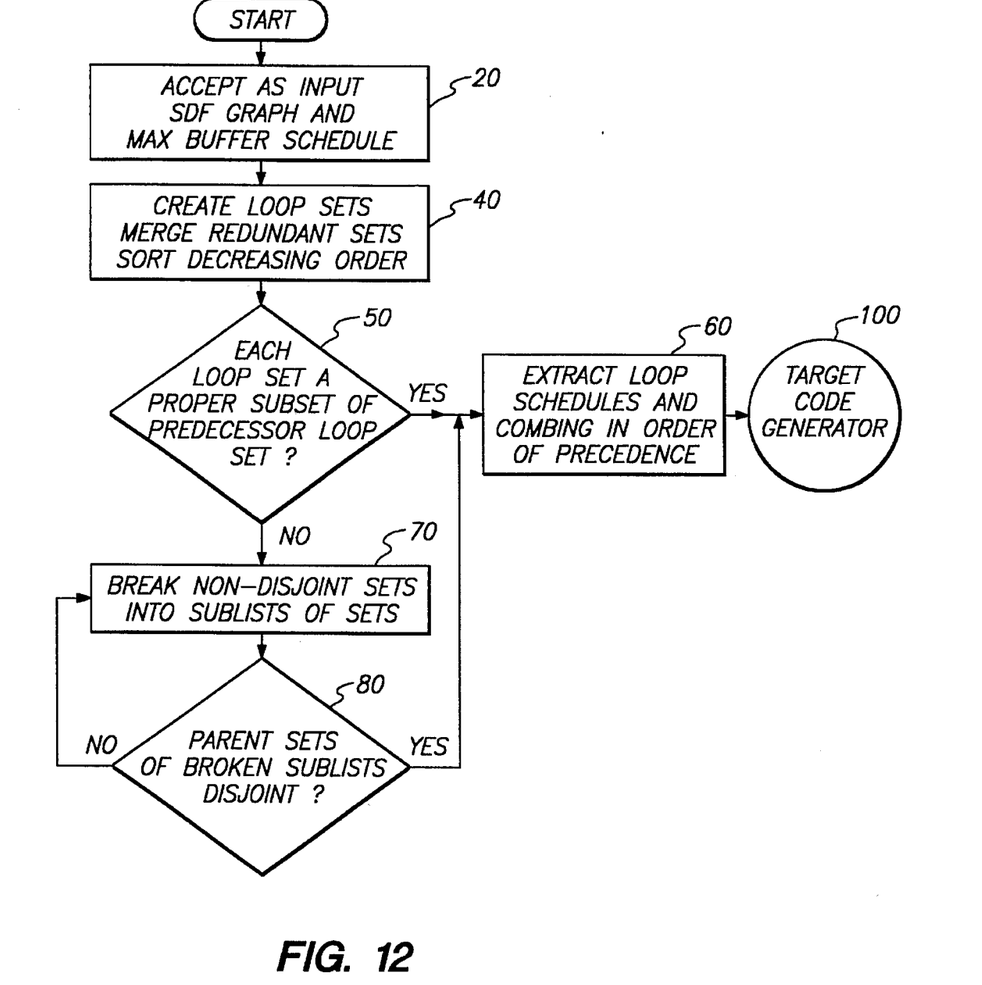
FIG. 12 is a flow chart of the method of the preferred embodiment of the present invention.

FIG. 12 illustrates a flow chart representation of the method of the present invention. Those skilled in the art will recognize that the present invention is intended to be implemented using any conventional program language, although the "C" programming language is preferred.

The method of the present invention is now described in conjunction with an example SDF graph which was presented in FIG. 5 to illustrate the prior art method of scheduling SDF graphs. In Block 20, the SDF graph 10 is accepted as input including identifiers for each of the actors, the rate of samples of data consumed and produced by each actor and the data flow paths between each of the actors of the system as represented by the graph of FIG. 5. Although the present method accepts as input the output of Block 20, a detailed description of how this information can be derived along with an example is provided. Block 20 then determines the maximum buffer length schedule for the SDF graph by first determining the integer invocation frequencies for each actor such that the balanced data flow requirements of the system are met (i.e. the number of times each actor must be invoked such that all of the samples produced in the system will also be consumed).

The integer invocation frequency for each actor is determined by setting the sample production rate of one of the actors to one and calculating the arc balance equations between each pair of connected actors. Setting $r(A)=1$, we get:
$3 \times r(B) = 1 \times r(A)$
$1 \times r(C) = 1 \times r(S)$
$1 \times r(D) = 2 \times r(C)$
$1 \times r(E) = 6 \times r(A)$
$1 \times r(F) = 1 \times r(E)$
$3 \times r(G) = 1 \times r(F)$
$1 \times r(H) = 1 \times r(F)$
$9 \times r(D) = 6 \times r(A)$
$1 \times r(G) = 2 \times r(A)$ Solving the rate equations by substituting $r(A)=1$ for each node:
$r(A)=1$
$r(B)=\frac{1}{3}$
$r(C)=\frac{1}{3}$
$r(D)=\frac{2}{3}$
$r(E)=6$
$r(F)=6$
$r(G)=2$
$r(H)=6$ The number of integer invocations for each actor is determined by multiplying by the lowest common denominator of all of the fractions, or in this example three, which yields an out from Block 20 of the following:
3A
1B
1C
2D
18E
18F
6G
18H Block 20 receives the above input and determines the prime factors of each of the invocation rates, including powers of those prime factors:
$3A \rightarrow 1 \times 3^1$
$1B \rightarrow 1$
$1C \rightarrow 1$
$2D \rightarrow 1 \times 2$
$18E \rightarrow 1 \times 2 \times 3^2$
$18F \rightarrow 1 \times 2 \times 3^2$
$6G \rightarrow 1 \times 2 \times 3^1$
$18H \rightarrow 1 \times 2 \times 3^2$
$18E \rightarrow 1 \times 2 \times 3^2$ Block 20 then orders the above results in accordance with precedence order and delay constraints defined for the system by the SDF graph, while maximizing the number of contiguous prime factors and/or powers of prime factors wherever the predefined precedence order and delay constraints permit. The delay constraints do not require any special consideration in this example because the actor D is only invoked twice per balanced condition of the system and therefore sufficient initial data exists such that its preceding actor never has to be invoked in order that D may be invoked. Further, because A has sufficient initial data that it can be invoked once before G is required to be executed, and because one invocation of A is sufficient for G to provide the number of data samples (through E and F) to execute the requisite number of times to supply the necessary data for A, there is no need to split the invocations of A to assure proper operation of the system.

The resulting ordering of the actors and the prime factors of their invocation rates as output by Block 20 is therefore:

$2D \rightarrow 1 \times 2$
$3A \rightarrow 1 \times 3$
$18E \rightarrow 1 \times 2 \times 3^2$
$18H \rightarrow 1 \times 2 \times 3^2$
$18F \rightarrow 1 \times 2 \times 3^2$
$6G \rightarrow 1 \times 2 \times 3$
$1B \rightarrow 1$
$1C \rightarrow 1$ This ordering represents one of the maximum buffer length schedules for the system described by the SDF graph of FIG. 5. This preferred order should permit the method of the present invention to produce an optimally nested loop schedule. It should be noted, however, that the method of the present invention will operate on any valid input schedule for the SDF graph.

This ordering is received as input by Block 40. Block 40 of FIG. 11 creates a loop set for each prime factor. The elements of each loop set are the actors the invocation frequency for which are factorable by that prime factor and are ordered in accordance with the order specified by the output of Block 20. The loop set for the prime factor of 1 contains only those nodes which are factorable by 1. The loop set for the prime factor of 2 contains only those actors which are factorable by 2, and so on. The loop sets created by Block 40 for the example are as follows:

S(1)≡{-,-,-,-,-,-,B,C}
S(2)≡{D,-,E,H,F,G,-,-}
S(3)≡{-,A,E,H,F,G,-,-}

If any of the above loop sets contain two or more contiguous members which are factorable by a power of its associated factor greater than one, Block 40 splits them into two sets, one being a subset of the other. For the current example, actors E, H and F are not only factorable by three, but also three squared ($3^2$). Thus the set S(3) is split as follows:

S(3)≡{-,A,E,H,F,G,-,-}
S(3)a≡{-,A,E,H,F,G,-,-}
S(3)b≡{-,-,E,H,F,-,-,-}

The above process is then reapplied to each new loop set created for that prime factor.

Block 40 splits any noncontiguous sets into separate sets. Thus in the current example:
S(2)≡{D,-,E,H,F,G,-,-} splits into:
S(2)a≡{D,-,-,-,-,-,-,-}
S(2)b≡{-,-,E,H,F,G,-,-}

The conclusion of these steps of creating the loop sets and splitting the created loop sets produces the following:
S(1)≡{-,-,-,-,-,-,B,C}
S(2)a ≡{D,-,-,-,-,-,-,-}
S(2)b ≡{-,-,E,H,F,G,-,-}
S(3)a≡{-,A,E,H,F,G,-,-}
S(3)b≡{-,-,E,H,F,-,-,-}--

Block 40 then merges equal loop sets. Although not applicable to the current example, if S(2) and S(3) were equal they would be merged.

Block 40 then sorts the loop sets into a set list in decreasing order of the number of actors in each set. In the current example, the output of Block 40 is as follows:
S(3)a≡{-,A,E,H,F,G,-,-}
S(2)b≡{-,-,E,H,F,G,-,-}
S(3)b≡{-,-,E,H,F,-,-,-}
S(1)≡{-,-,-,-,-,-,B,C}
S(2)a≡{D,-,-,-,-,-,-,-}

Decision Block 50 then determines whether each loop set is a proper subset of its predecessor in the loop set list or if not, then whether a loop set is a proper subset of all of its predecessors with which it intersects. In the current example, the answer is no and the method then proceeds to Block 70. Block 70 breaks the loop set list into 3 sublists which are proper subsets of its predecessor. The output of Block 70 is:

Sublist 1

S(3)a≡{-,A,E,H,F,G,-,-}
S(2)b≡{-,-,E,H,F,G,-,-}
S(3)b≡{-,-,E,H,F,-,-,-}

Sublist 2

S(1)≡{-,-,-,-,-,-,B,C}

Sublist 3

S(2)a≡{D,-,-,-,-,-,-,-}

Decision Block 80 then determines whether the parent sets of each sublist are disjoint from one another. The parent set in each sublist is the set with the most elements. In the current example, sets S(3)a, S(1) and S(2)a are all disjoint from one another. The loop set list can be broken into N sublists, wherein the parent sets for each sublist are disjoint from one another, having possibly N nested loops. Therefore, the method then moves to Block 60, which extracts the loop schedule for each sublist and combines them in accordance with the precedence order as described by the ordering of the actors in each set.

Figure 13:
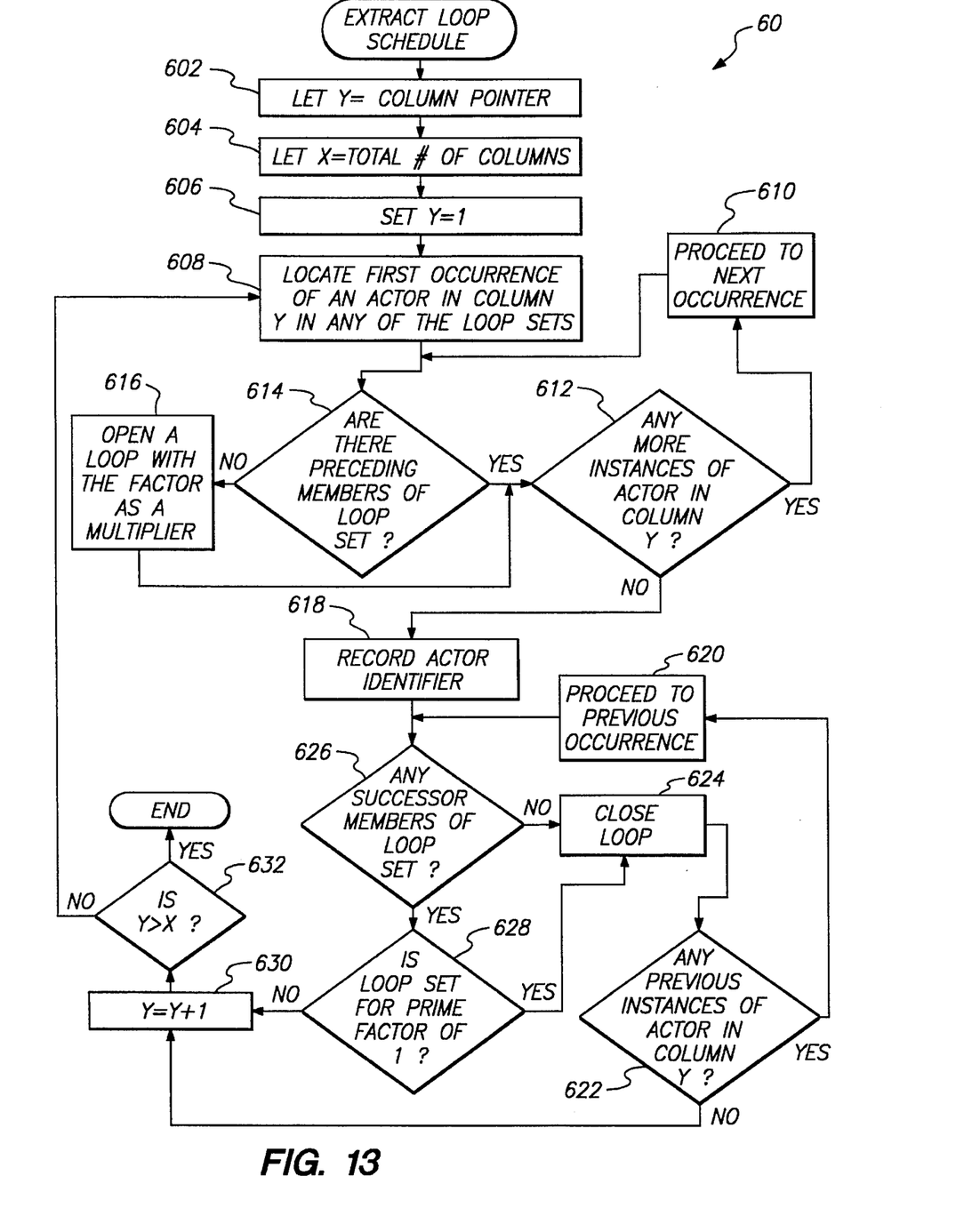
FIG. 13 is a flowchart describing the steps of extracting loop schedule according to the preferred embodiment of the present invention.

FIG. 13 shows the Block 60 in more detail. The flow diagram of FIG. 13 is now discussed in the context of extracting a looped schedule from the three sublists output from Block 70 for the current example.

The method first sets up a constant Y which represents a column pointer. A variable X is set equal to the total number of columns in the loop set lists, which in the current example is equal to eight. The column pointer Y is set equal to one as an initial condition.

Block 608 searches the first column to locate the first occurrence of an actor in that column, locating Actor D in the only loop set comprising the third sublist. Because there are no preceding members of the loop set, Block 616 requires that a loop be opened with the factor associated with the loop list as a multiplier. Thus, the schedule contains "(2". Because there are no more occurrences of D in column Y, the actor identifier D is recorded, yielding "(2D". Because there are no successor members of the loop set, Block 624 closes the loop so that the schedule is now "(2D)". The column pointer is incremented by Block 630 and because the column pointer has not exceeded the total number of columns, the method proceeds back to Block 608.

The first actor in column two is A; there are no preceding members of its loop set, so a loop is opened with the factor of S(3)a (i.e. 3) as its multiplier, building the schedule to "(2D)(3". Because there are no more occurrences of A in column two (Block 612), the actor identifier A is recorded per Block 618 and the schedule is now "(2D)(3A". There are successor members of the loop set containing A, and the loop set is not for a prime factor of one, therefore per decision Blocks 626 and 628 the method increments the column pointer to three (which is not greater than the total number of columns) and resumes at Block 608.

The first occurrence of an actor in column three is E. There are preceding members in the loop set and there are more occurrences of E in column three. Thus, per decision Blocks 614 and 612, the method proceeds to the next occurrence of Actor E per Block 610. Because there are no preceding members of set S(2)b, a loop is opened with the associated factor of two as a multiplier, yielding a schedule which is now "(2D)(3A(2". Because there is another occurrence of the actor E in column three, the method proceeds to the next occurrence per Blocks 612 and 610; the next occurrence is in the loop set S(3)a. There are no preceding members of the set, so per Block 616 a loop is opened with the associated factor as a multiplier which yields "(2D)(3A(2(3". Because there are no more occurrences of E in column three, the actor identifier is recorded per Blocks 612 and 618, yielding "(2D)(3A(2(3E". Because there are successor members of this loop set and the loop set is not for a prime factor of one, the column pointer is again incremented to four per Blocks 626, 628 and 630.

The method again proceeds from Block 608, identifying the first occurrence of an actor as H in loop set S(3)a. Per Blocks 614, 612 and 610, the method proceeds to the last occurrence of H, which is in loop set S(3)b. The actor identifier is recorded per Block 618 and the schedule is now "(2D)(3A(2(3EH". The column pointer is incremented to five, and the method proceeds to the final occurrence of the Actor F, in loop set S(2)b. The actor identifier is recorded per Block 618 and loop is closed per Blocks 626 and 624, yielding "(2D)(3A(2(3EHF)". The column pointer is incremented to six and the method proceeds to Block 608 once again because there are successor members of the set containing the previous occurrence of Actor F.

The method proceeds to the last occurrence of Actor 6 in column six, which is in loop set S(2)b. The actor identifier is recorded per Block 618 and because there are no successor actors in this set, the loop is closed yielding "(2D)(3A(2(3EHF)G)". Proceeding to the previous occurrence of G per Block 622, which is in loop set S(3)a, there are no successor members in this set and therefore the loop is closed yielding "(2D)(3A(2(3EHF)G))". Because there are no previous occurrences of G, the column pointer is incremented once again to seven and the method proceeds to Block 608.

The next identifier encountered in column seven is B in loop set S(1). Because there are no preceding members of the loop set, a loop is opened with the factor as a multiplier yielding "(2D)(3A(2(3EHF)G))(". There are no more occurrences of this actor in column seven so the actor identifier is recorded yielding "(2D)(3A(2(3EHF)G))(B". Because there is a successor member in the set, and the loop set is for a prime factor of one, the loop is closed and the column pointer is incremented to seven. The schedule now stands as "(2D)(3A(2(3EHF)G))(B)", and the method proceeds to Block 608.

The method proceeds identically with respect to Actor C, yielding a final schedule of "(2D)(3A(2(3EHF)G))(B)(C)". Because the column pointer is incremented to a value greater than the total number of columns, the procedure is complete and the schedule is output to target code generator 100 as shown in FIG. 12.

In summary, the method of the present invention involves first creating a loop set for each prime factor wherein the elements of each loop set are the actors, the invocation frequency from which are factorable by that prime factor and are ordered. The redundant created loop sets are merged so as to eliminate those sets with identical nodes. The merged loop sets are then sorted in decreasing order by the total number of node elements in each set. A determination is then made as to whether each loop set is a proper subset of its sorted ordered predecessor loop set with which it intersects and, if not, then breaking the non-disjoint sets into sublists of sets which are proper subsets of their predecessor sets and then determining whether the parent sets of the broken sublists are then disjoint from one another. If they are not then repeating these two substeps. The next step of the present method then involves extracting a loop schedule for each sublist and combining the extracted loop schedules in accordance with the sorted precedence ordering of the nodes in each of said loop sets to produce the code schedule sequences output to a target code generator. In such a manner, the code schedule sequences generated correspond to every potential type of actor or block in the system and can then be used to minimize both program and data memory requirements of the scheduled systems.

What is claimed is:

1. A method for deriving code schedule sequences for a target code generator from an input ordering of nodes and prime factors of their respective ordered invocation rates from an SDF graph representative of a system, comprising the steps of:

creating a loop set for each prime factor wherein the elements of each loop set are the actors, the invocation frequency from which are factorable by that prime factor and are ordered;

merging redundant created loop sets so as to eliminate those sets with identical nodes;

sorting the merged loop sets in decreasing order by the total number of node elements in each set;

determining whether each loop set is a proper subset of its sorted ordered predecessor loop set with which it intersects and, if not, then performing the substeps of:

(a) breaking the non-disjoint sets into sublists of sets which are proper subsets of their predecessor sets; and (b) determining whether the parent sets of the broken sublists are then disjoint from one another and, if not, repeating substeps (a) and (b);

extracting a loop schedule for each sublist; and combining the extracted loop schedules in accordance with the sorted precedence ordering of the nodes in each of said loop sets to generate the code schedule sequences.

2. A method as defined in claim 1 wherein the step of creating a loop set for each prime factor further comprises the step of: splitting into separate subsets those created loop sets in which two or more members of that set are factorable by a power greater than one.

3. A method as defined in claim 1 wherein the step of creating a loop set for each prime factor further comprises the step of: splitting into separate subsets those created loop sets in which the sets of nodes are non-contiguous and thereby contain sets of nodes which are interrupted by a dash.

4. A method as defined in claim 1 wherein the step of extracting a loop schedule for each sublist further comprises the step of: indexing down each of said sublists and across each of said node elements in said sublists.

5. A method as defined in claim 1 wherein the step of combining the extracted loop schedules in accordance with the sorted precedence ordering of the nodes of each of said loop sets to generate the code schedule sequences produces a text string of characters representative of the generated code schedule sequence.

\* \* \* \* \*